W. E. WILLIAMS.
METAL SPOKED WHEEL.
APPLICATION FILED NOV. 27, 1912.

1,113,078.

Patented Oct. 6, 1914.

3 SHEETS—SHEET 1.

Witnesses:
W. F. Kilroy
R. Burkhardt

Inventor.
W. E. Williams
by
Wallace Greene
atty.

W. E. WILLIAMS.
METAL SPOKED WHEEL.
APPLICATION FILED NOV. 27, 1912.
1,113,078.
Patented Oct. 6, 1914.
3 SHEETS—SHEET 2.
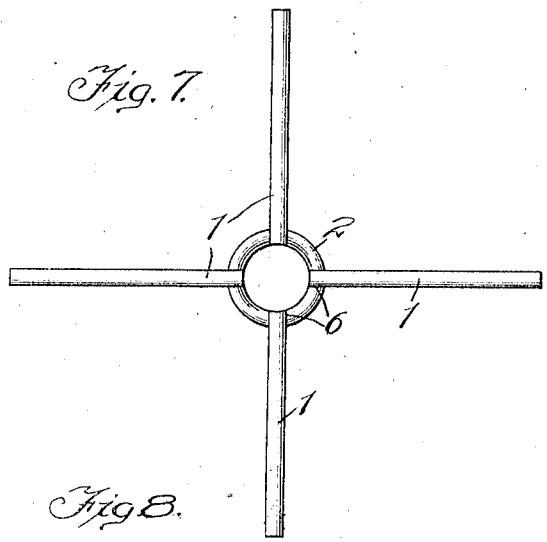
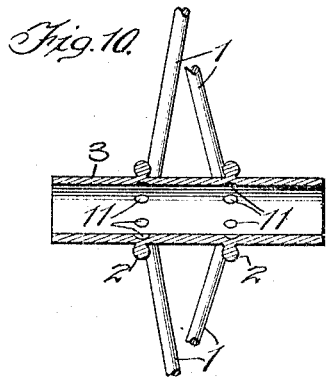
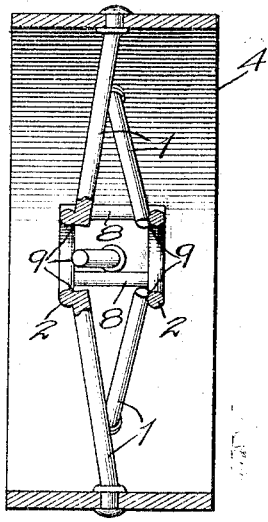
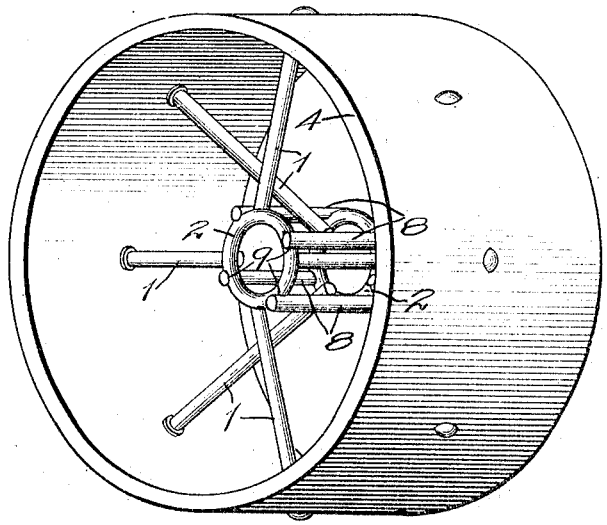
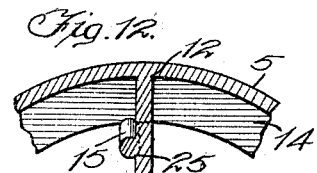
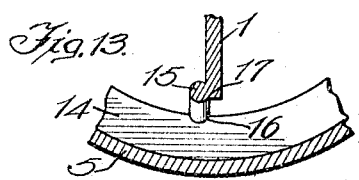
Witnesses:
W. F. Kilroy
R. Burkhardt
Inventor:
W. E. Williams
by Wallace Greene
atty.

W. E. WILLIAMS.
METAL SPOKED WHEEL.
APPLICATION FILED NOV. 27, 1912.
1,113,078.
Patented Oct. 6, 1914.
3 SHEETS—SHEET 3.
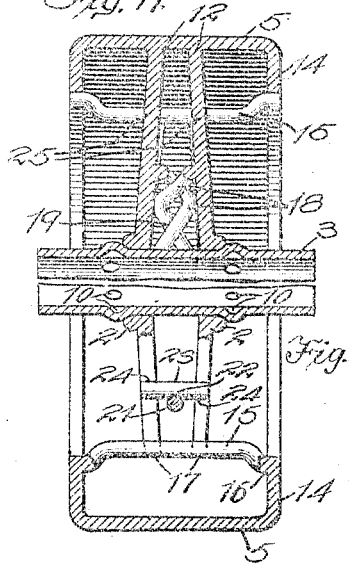
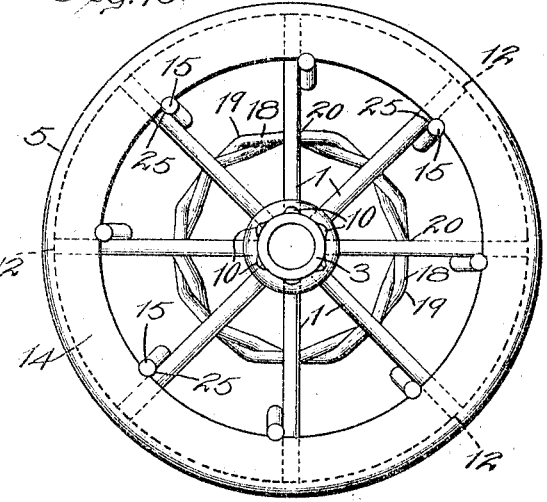
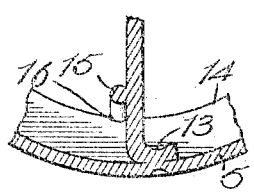
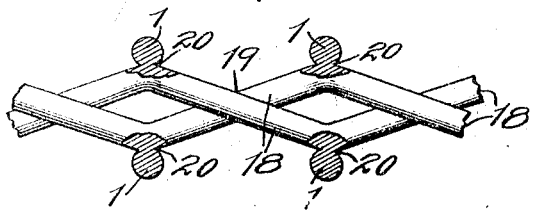
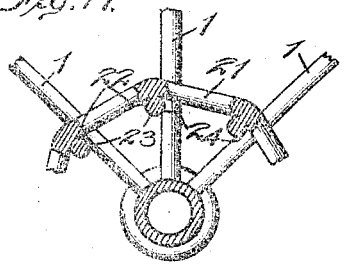
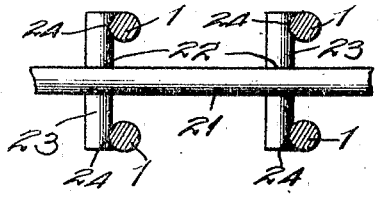
Witnesses:
W. F. Kilroy
P. Burkhardt
Inventor,
W. E. Williams
by Wallace Greene
atty.

UNITED STATES PATENT OFFICE.

WILLIAM ERASTUS WILLIAMS, OF CHICAGO, ILLINOIS.

METAL SPOKED WHEEL.

1,113,078.  Specification of Letters Patent.  Patented Oct. 6, 1914.

Application filed November 27, 1912. Serial No. 733,851.

*To all whom it may concern:*

Be it known that I, WILLIAM ERASTUS WILLIAMS, a citizen of the United States, residing in Chicago, county of Cook, and State of Illinois, with a post-office address at No. 331 South Clinton street, have invented a new and useful Improvement in Metal Spoked Wheels, as set forth in the annexed specification.

The object of my invention is to make a wheel that can be made cheaply and nearly complete by machinery, and at the same time will be light, strong, and durable.

Figure 1:
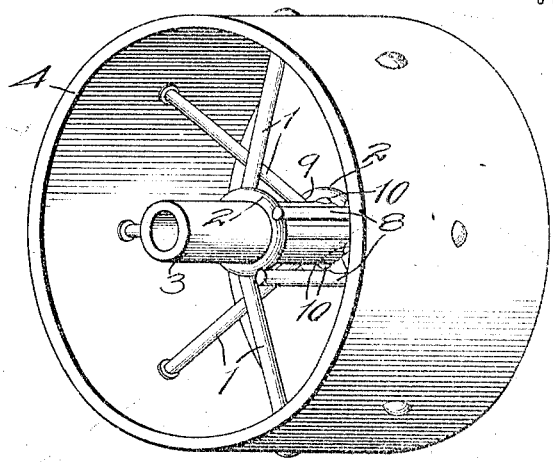
Figure 3:
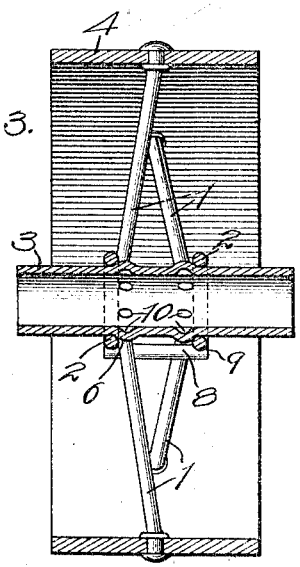
Figure 2:
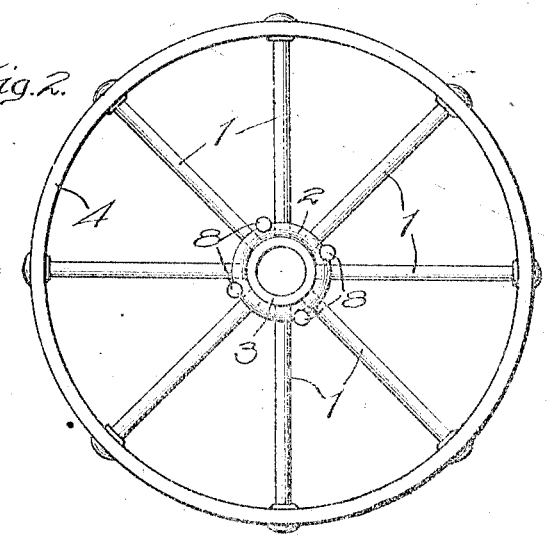
Figure 4:
Figure 5:
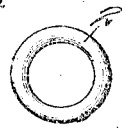
Figure 6:

Reference will be had to the accompanying drawings in which,

Figure 1 is a perspective view of a finished wheel embodying my invention. Fig. 2 is an elevation. Fig. 3 is a vertical section. Fig. 4 is a single spoke. Fig. 5 is one of the hub rings. Fig. 6 is a section of the hub tube or sleeve. Fig. 7 is a plan of the spider made by the spokes of one side after being welded to the hub ring of that side. Fig. 8 is a sectional elevation through the wheel before the hub sleeve is inserted. Fig. 9 is a perspective view of the wheel shown in section in Fig. 8. Fig. 10 is a sectional detail through the hub, showing one way of fastening in the hub sleeve. Fig. 11 is a vertical section showing an alternative construction of spoke and hub fastening. Fig. 11ª is a view analogous to Fig. 11 showing a slightly modified construction. Fig. 12 is a sectional detail view showing a spoke secured to the rim as in Fig. 11. Fig. 13 is a view analogous to Fig. 12 showing another way of securing a spoke to the rim. Fig. 14 is a similar view showing still another form of spoke and rim fastening. Fig. 15 is a side view of a completed wheel embodying alternative constructions. Fig. 16 is a detail of spoke retaining rings shown in Fig. 15. Figs. 17 and 18 are substitute designs for the detail forms of spoke retaining ring shown in Figs. 15 and 16.

Heretofore in the manufacture of wheels of this class, it has generally been customary to fasten the iron spokes in the rim by upsetting the spoke on one, or both sides of the tire, or rim, making what may be termed a riveted joint. The spokes have been riveted in the hub also, or screwed into the hub, or the hub has been cast in position to inclose the ends of the spokes. When the spokes are riveted in the hub it is usually customary to insert a bushing to take the bearing of the axle and cover up the riveted ends of the spokes on the inside of the hub; but with my design, no such bushing is necessary.

Referring now to the above mentioned Figs. 1 to 9, which illustrate the preferred construction, the wheel consists of spokes 1, hub rings 2, forming, with or without other members, a sort of hub structure, a hub sleeve 3, and a rim 4, all of commercial, weldable steel or iron. The spokes may be, primarily, simple rods as shown in Fig. 4, the hub rings, Fig. 2, are made of like rods, the sleeve, Fig. 6, is a simple tube, and the rim is a cylinder formed from a flat bar. The spokes, however, may have their ends differently shaped, the sleeve may be varied in form, and the rim may be formed from a channel bar of suitable cross section, as indicated in Fig. 11. Spiders, usually two in number, Fig. 7, are formed by lap welding, at 6, a set of spokes 1 to each ring 2, such welding being quickly done and very strong, when the two members are of nearly equal size. The spiders may be connected by tie rods 8 welded in like manner to the peripheries of the rings 2, forming a cage-like structure which, with the rim added, is shown in Figs. 8, 9.

Before or after the rim is secured to the spokes, the hub sleeve 3 is placed in the rings, either loosely, the rings being subsequently reduced in diameter or the sleeve being expanded at desired points to secure rigid connection of the two, or the sleeve is made of a diameter slightly greater than the interior diameter of the rings and forced into the latter by the application of great force, the ductility of the rings permitting the necessary stretching. In either construction no machining is necessary.

Instead of forming the spiders first, the spokes may be first secured to the rim and the rings be then added; or, by automatic machinery, both ends of the spokes may be secured simultaneously.

The sleeves may be further secured in the rings by forming on the former outwardly extending projections 10, as shown in Fig. 3; or the same parts may be united by spot welding at 11, Fig. 10, preferably by using an electric current.

As has been intimated, the tie rods 8 are not indispensable to secure a wheel of practical value. As a further optional feature of construction, the spokes may be buttwelded to the rim, as at 12, Figs. 11, 12, or may be bent over and welded as shown at 13, Fig. 14.

Some wheels are required to have internal projecting flanges, 14. See Figs. 11, 12, 13, 14 and 15. When the internal flanges (14) are used, I may weld my spokes thereto through the medium of the cross rods, (15) which are welded at 16 to the flanges by the same crosswise welds as are used to weld the spokes to the hub rings. The spokes being also welded to the rods, (15) by cross welds, (25). A spring, or elastic effect may be secured by means of these cross rods, provided that the spokes do not extend out and engage the rim. This construction is shown by the lower side of Fig. 11 and by Fig. 13 where the spokes end at 17, where they are welded to rods 15.

Wheels having iron rods for spokes, usually act under load by both the thrust on the lower spokes and the tension on the upper ones, but the full efficiency is never gained because the spokes are so small in cross section that they spring sidewise when under heavy thrust. To guard against the springing sidewise of the spokes under thrust, I weld onto them some intermediate circular tie rods, (18) welded to each other where they cross at 19 and to the spokes at 20. See Figs. 15 and 16.

Instead of the two rods, 18, welded to each other and the spokes as shown by Figs. 15 and 16, I may use one rod 21 welded at 22 to cross rods 23, which are welded to spokes at 24.

Thus by tying the spokes together in the manner indicated, a much stronger wheel is made. By the construction shown by my invention, no preheating of the parts is always necessary but the rods forming the spokes and rings may be joined by electric welding more quickly and by less handling than by any other way.

What I claim is:

1. In a wheel of the class described, the combination with a tubular member adapted to receive an axle, of spaced rings encircling and firmly fixed to said member, sets of spokes, those of each set having their inner ends overlapping and welded to the side of the corresponding ring, and a rim secured to the outer ends of the spokes.

2. In a wheel of the class described, the combination with a tubular central member adapted to receive an axle, of spaced rings encircling and firmly fixed to said member, tie bars welded to the peripheral surfaces of the rings to connect them, sets of spokes having their inner ends overlapping and welded to the sides of the corresponding rings, and a rim secured to the outer ends of the spokes.

3. In a wheel of the class described, the combination with a tubular central member adapted to receive an axle, of spaced rings encircling and internally welded to said member, sets of spokes in different planes having their inner ends welded to the sides of the corresponding rings, and a rim secured to the outer ends of the spokes.

4. In a wheel of the class described, the combination with a hub structure, of sets of spokes in different planes secured to said structure, an annular member lying between the sets intermediate their ends and welded to all the spokes, and a rim connected with the outer ends of the spokes.

5. The combination with a hub structure and a rim, of sets of spokes in different planes, connecting the hub structure and rim, and ties passing obliquely from individual spokes of one set to non-corresponding spokes of the other set and welded to the spokes thus connected.

6. A wheel having a hub structure, a rim provided with inwardly extending marginal flanges, tie rods connecting said flanges and welded thereto, and spokes welded to said tie rods and connecting them with the hub structure.

In witness whereof, I have hereunto subscribed my name in the city of Hammond, State of Indiana, on the 19th day of Nov., 1912, in the presence of two subscribing witnesses.

WILLIAM ERASTUS WILLIAMS.

Witnesses:
HERMAN JENS,
AUGUST C. RIECHERS.